United States Patent
Hill et al.

(10) Patent No.: US 8,627,673 B2
(45) Date of Patent: Jan. 14, 2014

(54) ATMOSPHERIC WATER HARVESTERS

(75) Inventors: James W. Hill, Tampa, FL (US); Christopher G. Preston, St. Petersburg, FL (US); Michael D. Max, St. Pete Beach, FL (US)

(73) Assignee: Water Generating Systems LLC, Arlington, VA (US)

( * ) Notice: Subject to any disclaimer, the term of this patent is extended or adjusted under 35 U.S.C. 154(b) by 652 days.

(21) Appl. No.: 12/054,690

(22) Filed: Mar. 25, 2008

(65) Prior Publication Data

US 2009/0241580 A1    Oct. 1, 2009

(51) Int. Cl.
*F25D 21/00*    (2006.01)
(52) U.S. Cl.
USPC .................. 62/291; 62/176.6; 62/292
(58) Field of Classification Search
USPC ......... 62/93, 272, 285, 288, 291, 92, 95, 129, 62/140, 176.6, 185, 292, 324.5, 426, 498, 62/427; 165/100–103
See application file for complete search history.

(56) References Cited

U.S. PATENT DOCUMENTS

| | | | |
|---|---|---|---|
| 2,401,560 A * | 6/1946 | Graham et al. | 165/59 |
| 3,259,181 A | 7/1966 | Ashley et al. | |
| 4,197,713 A | 4/1980 | Bulang | |
| 4,280,335 A | 7/1981 | Perez et al. | |
| 4,761,966 A * | 8/1988 | Stark | 62/176.6 |
| 4,827,733 A | 5/1989 | Dinh | |
| 5,005,523 A * | 4/1991 | Foster | 119/319 |
| 5,040,377 A | 8/1991 | Braun et al. | |
| 5,106,512 A | 4/1992 | Reidy | |
| 5,131,238 A | 7/1992 | Meckler | |
| 5,149,446 A | 9/1992 | Reidy | |
| 5,167,838 A | 12/1992 | Wilensky | |
| 5,181,387 A | 1/1993 | Meckler | |
| 5,203,989 A | 4/1993 | Reidy | |
| 5,230,466 A | 7/1993 | Moriya et al. | |
| 5,259,203 A | 11/1993 | Engel et al. | |
| 5,309,725 A | 5/1994 | Cayce | |
| 5,366,705 A | 11/1994 | Reidy | |
| 5,400,607 A | 3/1995 | Cayce | |

(Continued)

FOREIGN PATENT DOCUMENTS

| | | |
|---|---|---|
| JP | 09089297 | 4/1997 |
| JP | 2002267204 | 9/2002 |

OTHER PUBLICATIONS

Int'al Search Report.
Written Opinion.

(Continued)

*Primary Examiner* — Allana Lewin
*Assistant Examiner* — Emmanuel Duke
(74) *Attorney, Agent, or Firm* — KMF Patent Services, PLLC; Kenneth M. Fagin, Esq.; S. Peter Konzel, Esq.

(57) ABSTRACT

An atmospheric water harvester includes a cooling member over which humid air flows to condense moisture from the atmosphere. The cooling member may be the evaporator of a conventional, gas vapor-based refrigeration circuit. If a gas vapor-based refrigeration circuit is used, the compressor of the circuit may be variable speed. A fan or impeller used to move air through the system may also be variable speed. A preferred embodiment includes a variable flow geometry thermal economizer section configured such that, to varying degrees, the incoming air may be pre-cooled, before it passes over the cooling member, by heat exchange with colder air that has already flowed over the cooling member.

19 Claims, 9 Drawing Sheets

(56) References Cited

U.S. PATENT DOCUMENTS

| | | | |
|---|---|---|---|
| 5,517,829 A | 5/1996 | Michael | |
| 5,553,462 A | 9/1996 | Taylor | |
| 5,578,280 A | 11/1996 | Kazi et al. | |
| 5,600,969 A | 2/1997 | Low | |
| 5,623,831 A | 4/1997 | Mesher | |
| 5,669,221 A | 9/1997 | LeBleu et al. | |
| 5,845,504 A | 12/1998 | LeBleu | |
| 5,893,408 A | 4/1999 | Stark | |
| 5,901,565 A | 5/1999 | Morton, Jr. | |
| 6,029,461 A | 2/2000 | Zakryk | |
| 6,058,718 A | 5/2000 | Forsberg et al. | |
| 6,170,271 B1 | 1/2001 | Sullivan | |
| 6,182,453 B1 | 2/2001 | Forsberg | |
| 6,209,337 B1 | 4/2001 | Edwards | |
| 6,269,650 B1 | 8/2001 | Shaw | |
| 6,319,410 B1 | 11/2001 | Allington et al. | |
| 6,427,454 B1 | 8/2002 | West | |
| 6,490,879 B1 | 12/2002 | Lloyd et al. | |
| 6,505,477 B1 | 1/2003 | Smith et al. | |
| 6,588,226 B1 | 7/2003 | Semrow et al. | |
| 6,644,060 B1 | 11/2003 | Dagan | |
| 6,684,648 B2 | 2/2004 | Faqih | |
| 6,739,142 B2 | 5/2004 | Korin | |
| 6,755,037 B2 | 6/2004 | Engel et al. | |
| 6,826,920 B2 * | 12/2004 | Wacker | 62/176.6 |
| 6,843,309 B2 | 1/2005 | Taniguchi et al. | |
| 6,868,690 B2 | 3/2005 | Faqih | |
| 6,898,943 B2 | 5/2005 | Tanaka | |
| 6,978,631 B2 | 12/2005 | Fuller | |
| 7,028,478 B2 | 4/2006 | Prentice, III | |
| 7,086,239 B2 | 8/2006 | Haas et al. | |
| 7,121,101 B2 | 10/2006 | Merritt | |
| 7,194,870 B1 * | 3/2007 | O'Brien et al. | 62/292 |
| 7,246,503 B1 | 7/2007 | O'Brien et al. | |
| 7,251,953 B2 * | 8/2007 | Wetzel et al. | 62/419 |
| 7,272,947 B2 | 9/2007 | Anderson | |
| 7,328,584 B2 | 2/2008 | Craven | |
| 7,343,754 B2 | 3/2008 | Ritchey | |
| 7,373,787 B2 | 5/2008 | Forsberg et al. | |
| 7,514,056 B2 | 4/2009 | Fradette et al. | |
| 2003/0014983 A1 | 1/2003 | Maisotsenko et al. | |
| 2004/0134853 A1 | 7/2004 | Miller, III | |
| 2004/0244398 A1 | 12/2004 | Radermacher et al. | |
| 2005/0039467 A1 | 2/2005 | Korin | |
| 2005/0103615 A1 | 5/2005 | Ritchey | |
| 2006/0021375 A1 * | 2/2006 | Wetzel et al. | 62/419 |
| 2006/0032493 A1 | 2/2006 | Ritchey | |
| 2006/0053819 A1 | 3/2006 | Wu et al. | |
| 2006/0086112 A1 | 4/2006 | Bloemer et al. | |
| 2006/0101838 A1 | 5/2006 | Ritchey | |
| 2006/0201162 A1 | 9/2006 | Hsieh | |
| 2006/0248904 A1 | 11/2006 | Ludwig | |
| 2006/0255164 A1 | 11/2006 | Oppermann et al. | |
| 2006/0257258 A1 | 11/2006 | Zwebner | |
| 2007/0012060 A1 | 1/2007 | Simons | |
| 2007/0028769 A1 | 2/2007 | Eplee et al. | |
| 2007/0039345 A1 | 2/2007 | Forsberg et al. | |
| 2007/0079619 A1 * | 4/2007 | Hamada et al. | 62/180 |
| 2007/0079624 A1 | 4/2007 | Max | |
| 2007/0095078 A1 | 5/2007 | Senf, Jr. et al. | |
| 2007/0137590 A1 | 6/2007 | Vetrovec | |
| 2007/0175063 A1 | 8/2007 | Morgan et al. | |
| 2007/0277540 A1 | 12/2007 | Fernandes | |
| 2007/0280400 A1 | 12/2007 | Keller | |
| 2007/0295673 A1 | 12/2007 | Enis et al. | |
| 2008/0078842 A1 | 4/2008 | MacDonald | |
| 2008/0229764 A1 | 9/2008 | Taras et al. | |
| 2008/0282704 A1 | 11/2008 | Shalom | |
| 2008/0314062 A1 | 12/2008 | Ritchey | |
| 2009/0226308 A1 | 9/2009 | Vandor | |
| 2010/0059358 A1 | 3/2010 | Ritchey | |
| 2010/0263396 A1 | 10/2010 | Ritchey | |

OTHER PUBLICATIONS

Owner's Manual, Phoenix Restoration Equipment, 200 HT LGR Dehumidifier, Rev. Oct. 2007.

Owner's Manual, Dri-Eaz Products, Inc., Evolution LGR Dehumidifier.

Notice of Allowance and List of References, co-pending CIP U.S. Appl. No. 12/418,077, mailed Apr. 26, 2011.

* cited by examiner

ATMOSPHERIC WATER HARVESTERS

GOVERNMENTAL SUPPORT AND INTEREST

This invention was made with Governmental Support under Contract Number N00014-05-C-0378 dated Sep. 14, 2005, and issued by the Office of Naval Research (ONR). The Government has certain rights in the invention.

FIELD OF THE INVENTION

The invention relates to atmospheric moisture harvesting and improvements in the efficiency of condensing water from air and in apparatus relating thereto. More particularly, the invention provides improved energy efficient extraction of water from air, particularly in outdoor settings and over a range of relative humidity.

BACKGROUND OF THE INVENTION

Atmospheric water harvesting is intended to produce water in the general vicinity of its place of use. Producing potable water near its place of use removes the requirement for either temporary or fixed water delivery systems such as pipelines and canals or temporary delivery systems such as bulk motorized water tankers. Production of high-quality water at or near its place of use is superior to transporting bottled drinking water, which requires substantial consumption of energy for delivery and waste disposal. Water harvesters are also superior environmentally because water bottle disposal is not an issue; water bottles are reused in conjunction with water harvesting. In addition, the water produced from suitably designed and operated water harvesters is pure and suitable and safe for drinking with very little treatment.

Water harvesting has not generally been regarded as a replacement for conventional piped water supplies because of its relatively higher cost and lower volumes. In present water systems, there is an effective "waste" of public high quality water that is used for low-quality uses, such as flushing toilets and watering lawns.

Conventional water supplies are running short because of increased demand and local overuse of natural water supplies. In addition, the cost of conventional water supplies is increasing significantly. One of the drivers of increased water cost is the incorporation of desalinated water, which is relatively expensive to produce using current technologies, in the basic supply. Perceptions about the quality of public water supply has led to bottled water being used increasingly as a regular personal drinking water source, even though it is much more expensive than public water supply.

In atmospheric water harvesting, condensation of water is achieved by providing and maintaining a chilled surface upon which water from moist air condenses. This is well known as a byproduct of chilling air, as in air conditioning systems in which chilling the air is the objective or in air dehumidification systems in which the objective is to achieve relative dryness of the exhaust air. However, water produced as a byproduct in these systems is more expensive to produce than that which is produced in a water harvester apparatus that is optimized for energy efficient water production by not overcooling air or water. In addition, byproduct water quality is generally not suitable for drinking, and can be dangerous, without additional treatment that is not provided for by an apparatus that does not have water production as a primary objective.

Water harvesting apparatus that has been specifically designed to produce water from air already exists (but without the efficiency and sophistication of this invention) which allows the production of water of the same or superior quality as bottled water but without the delivery or environmental waste issues and in quantities that are suitable for personal or family use on a regular and extended basis. Water harvesting provides high quality potable water without the continued cost of producing bottles directly in proportion to the quantity of water delivered, at a lower cost than bottled water.

SUMMARY OF THE INVENTION

The present invention provides improved apparatus and methods for condensing water from air. These improvements involve, but are not limited to, an improved water condenser, improved condenser airflow control, a variable speed air impeller, forced air or conductive cooling of all heat-producing parts of the system, new intake air controls, and provision for system-controlled on/off switching for the compressor. The apparatus is robustly designed and constructed, is resistant to common handling vibration and shock, and is meant to be moved by hand locally although it may also be fixed. The apparatus is intended for use either outdoors or indoors in a semi-autonomous mode, and where air quality is generally good. Water is pumped from a removable collection tank underneath the evaporator into which water has flowed by gravity, either directly or through a water treatment system to the user. Although the water exiting the water harvester has the character of distilled water and is very pure, for prolonged drinking of this water alone, some of the produced water should be remineralized.

BRIEF DESCRIPTION OF THE DRAWINGS

The invention will now be described in greater detail in connection with the Figures, in which.

DETAILED DESCRIPTION OF EMBODIMENTS OF THE INVENTION

Figure 1:
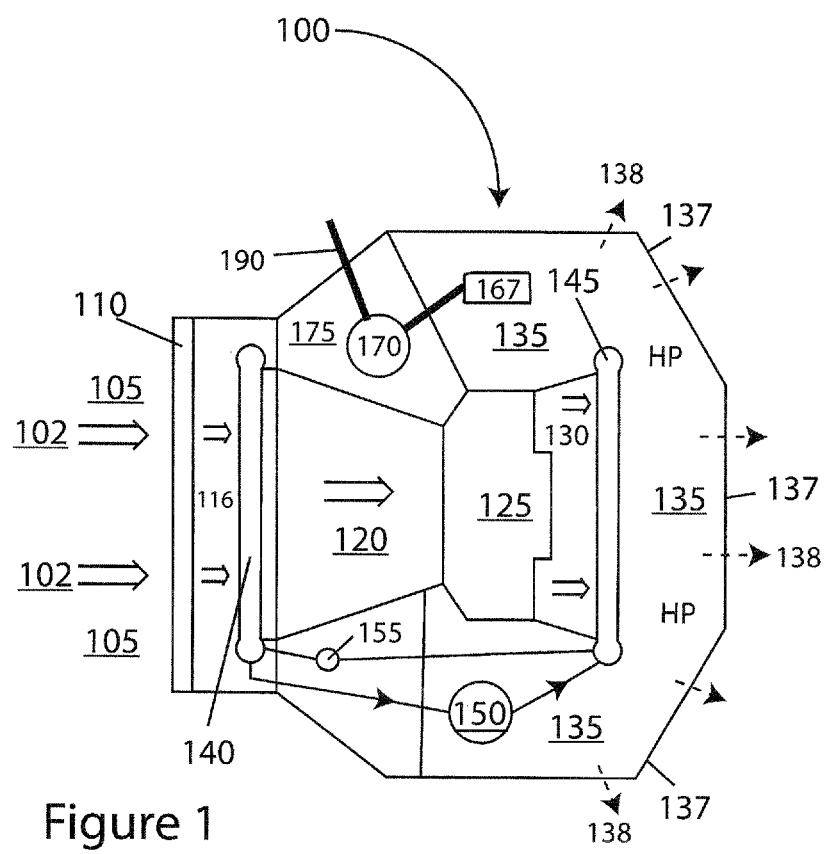
FIG. 1 is schematic plan view of a first embodiment of an atmospheric water harvester according to the invention.

FIG. 1 shows a first embodiment 100 of an atmospheric water harvester (AWH) according to the invention. The apparatus for drawing in and exhausting air and refrigeration causes water vapor to be condensed into liquid water within an enclosed apparatus so that it can be collected. The apparatus 100 may be placed out-of-doors, where it is surrounded by moist air. Ambient air 102 is drawn into the AWH 100 under suction and expelled under pressure. This AWH 100 includes an airflow system having an intake 105; an air filter 110; and air passages 116, 120 upstream from an impeller or fan 125. The impeller/fan 125 is responsible for drawing air into and forcing it through the apparatus 100 and into an exhaust chamber 135, from which the air exits through vents 138 (venting air is indicated by dashed-stem arrows) in the external vented wall 137 of the high-pressure exhaust chamber 135. The refrigeration system in general includes an evaporator (cooling member) 140 in which liquid refrigerant is allowed to vaporize, thereby causing the evaporator 140 to become cold and cooling the air passing across it so as to condense water from the air; and a compressor 150, in which the refrigerant gas from the evaporator 140 is compressed into a liquid by the combination of higher pressure and cooling of the refrigerant by air forced through a condenser 145.

Ambient air 102 is drawn in through the filter assembly 110, which may include more than one filter or type of filter, into the pre-evaporator air passage 116. Water is condensed from the air on the evaporator/heat exchanger 140 as the air is pulled through it. Condensation on the evaporator is the key process of atmospheric water harvesting. The condensation process is made as efficient as possible by using a high-thermal-transfer heat exchanger for the evaporator, for instance, a narrow-bore $PF^2$ heat exchanger manufactured by the Modine Manufacturing Company. In order to prevent aluminum or other metals from the evaporator from being dissolved in condensing water, a coating is applied to the evaporator 140. The coating also may have antibacterial properties. Among, but not limited to, examples of this type of coating are a silver ion-containing epoxy available from Burke Industrial Coatings and another (Alcoat 5000 or similar) available from Circle-Prosco that also offers corrosion protection and may assist shedding of water from the condensing surface of the evaporator 140.

Regarding the compressor 150, a fixed or a variable speed compressor may be used. In one configuration of an AWH according to the invention, a fixed speed compressor, which is the simplest type and is most commonly used in refrigeration apparatus, is used. Such compressors are cycled on and off to minimize their running time. They are commonly operated along with a temperature-sensing device 155 that measures and controls the system superheat, which is the difference between the temperature of the gas entering the compressor 150 and the evaporation temperature of the liquid refrigerant within the evaporator 140. This device 155 (e.g., a thermostatic expansion valve (TXV or TEV), amongst other types of electronic and mechanical devices) is located between the condenser 145 and the evaporator 140. It controls temperature in the evaporator 140, in which vaporization of the refrigerant is directly related to cooling potential, by metering the flow of fluid refrigerant through the system. In an alternate configuration, a variable speed compressor 150 is used, which runs almost continuously but only as fast as necessary to maintain the desired pressure differential between the evaporator 140 and the condenser 145. A temperature-sensing device 155 that measures and controls the system superheat may be used with this sort of variable-speed compressor as well. In either of these configurations, a cut-off switch (not shown here), which is operated by sensors that detect freeze-up on the evaporator, turns off the compressor to allow ice to melt before restarting.

Figure 2A:
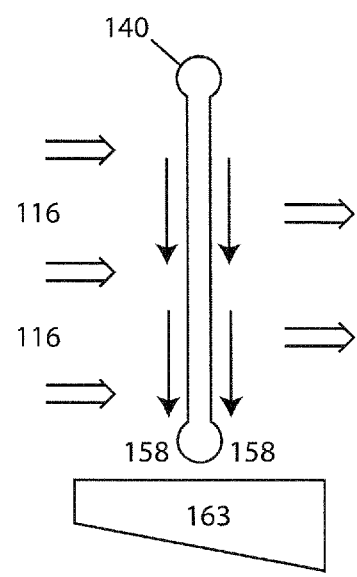
FIGS. 2a and 2b are schematic side views of two alternative orientations, respectively, of a heat exchanger/evaporator used in an atmospheric water harvester according to the invention.

In the AWH embodiment 100 shown in FIG. 1, the evaporator 140 is in a vertical orientation, as shown in FIG. 2a. Water (black, single stem arrows) 158 formed on the upper evaporator surfaces flows down over the subjacent evaporator surfaces, which has the effect of amalgamating the water into rivulets as well as droplets as it flows from the evaporator 140 to the subjacent water collector 163. Because rivulets are more coherent water masses with higher mass to surface area ratios, they are less liable to lose water to the airstream moving at about a 90 degree angle across the flowing condensed water. Additionally, the water passing from the evaporator 140 to the water collection tank 163 may be only very slightly affected by air flow, which does not impinge toward the water collection tank 163.

Figure 2B:
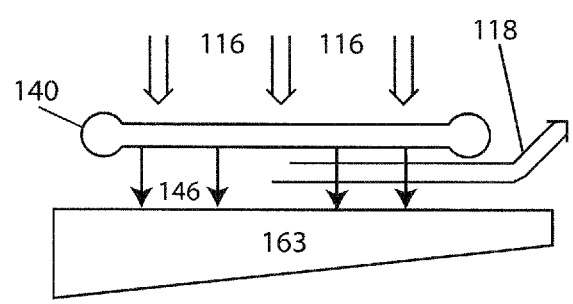

With an alternate orientation of the evaporator as shown in FIG. 2b, water is removed from a horizontally oriented evaporator (also labeled 140) by forced air moving in the same direction as the condensed water separating from the evaporator 140. Water droplets 146 flow directly downward (single-stem black arrows) under the combined influence of gravity and forced air into the water collection tank 163. Water is more rapidly removed following condensation, which may have the result of reducing overcooling of already condensed water and allowing better heat transfer than in the case of coalescing water flowing over the evaporator. This is because water on the evaporator 140 acts as an insulator against heat transfer between the evaporator surface and the moist air 114. This horizontal orientation minimizes run-off of amalgamated or rivulet/coalesced water on the evaporator surface in favor of keeping most of the water in the form of droplets until it leaves the evaporator. However, droplets 146 have to cross the exhaust air path 118 and may be entrained in the air. Angled evaporators (not illustrated) would have attributes intermediate between upright or vertical and horizontal evaporators.

Water that has condensed on the evaporator 140 flows downward by gravity into a water collection region tank 163 beneath the evaporator and then into a removable water collection tank (not shown) that is from five to ten gallons or greater in capacity. Multiple tanks allow users to carry water from the water harvester. Alternatively, water may be pumped from the collection tank by a pump 167, located in the body of the AWH, through an industry-standard replaceable water filter 170 that is located in a compartment 175 that is isolated from the airflow passages within the apparatus. Treated water 190 that has passed through the water treatment system 170 remains under pressure after passing through the filter and exits from ports (not shown) at either or both the top and sides of the apparatus 100. (A straight-through water filter body without a filter may be used to produce water that is to be used for industrial purposes or that is otherwise not required to be treated to drinking water standards.)

Air exiting from the evaporator on which water has condensed then passes into an air passage 120 under suction caused by the fan/impeller 125. The air from the fan/impeller 125 then passes through a downstream air passage 130 and through the vaned condenser 145, where the air cools the compressed refrigerant that is being pumped to the condenser 145 from the compressor 150. After heat exchange warms it, the exhaust air passes into an exhaust chamber 135 from which it is exhausted through louvers in the walls of the AWH 100, the approximate locations of which are shown by arrows.

In a suitable configuration of the AWH 100, the impeller or fan 125 is capable of running at variable speed, which is controlled by varying electrical current or voltage. This allows the impeller or fan to force air through the apparatus at different velocities to optimize water production on the evaporator with respect to the electrical energy consumed. A variable speed impeller or fan allows the airflow over the evaporator to be varied, optimizing water production by, for instance, increasing fan speed for high humidity air or preventing or remediating unintended freeze-up where slower airflow could otherwise allow the air to reach a dew point below freezing. (Slowly moving air can be cooled to lower temperatures and has a greater likelihood of reaching dew points below freezing, regardless of the original air temperature.) Alternatively, the fan or impeller may be fixed speed, which may be less efficient under a wide range of input air temperature and humidity conditions but less expensive to implement and not significantly more expensive to operate under consistently humid conditions such as may be found on tropical, low-lying, smaller islands.

Sealed electronic controls and computer systems that control the refrigeration and airflow system for all embodiments of this invention are integrated in a control pad (not shown) that is located in the top cover of the water harvester for easy operation. In order to prevent overheating of the electronic control pad, the bottom surface of the electronic control pad is a conduction heat exchanger that is exposed to the cold airflow stream upstream and/or downstream from the condenser. Thus, heat that may be produced within the pad or by heating of the pad externally by heat exchange with ambient air or heating by the sun may be removed and the pad kept within operating temperature conditions.

In the embodiment 100, the compressor 150 is located within the exhaust air chamber 135. Where a compressor is used that is designed to be cooled internally, for instance using refrigerant discharge inside the compressor, there is no need for other cooling of the compressor. With that type of compressor, it is possible to insulate it with noise-absorbing material for quieter operation. The air within this chamber is slightly over-pressured with respect to ambient air outside the apparatus, which allows for distribution of air within the chamber 135 in the direction of sidewall vents. Air vents that form a large proportion of the side of the enclosure are located generally in the exterior sidewall 137 of the exhaust chamber 135 (exhaust air shown by black arrows but actual vents may be widespread in the wall) in order to allow air to vent from the apparatus.

Figure 3:
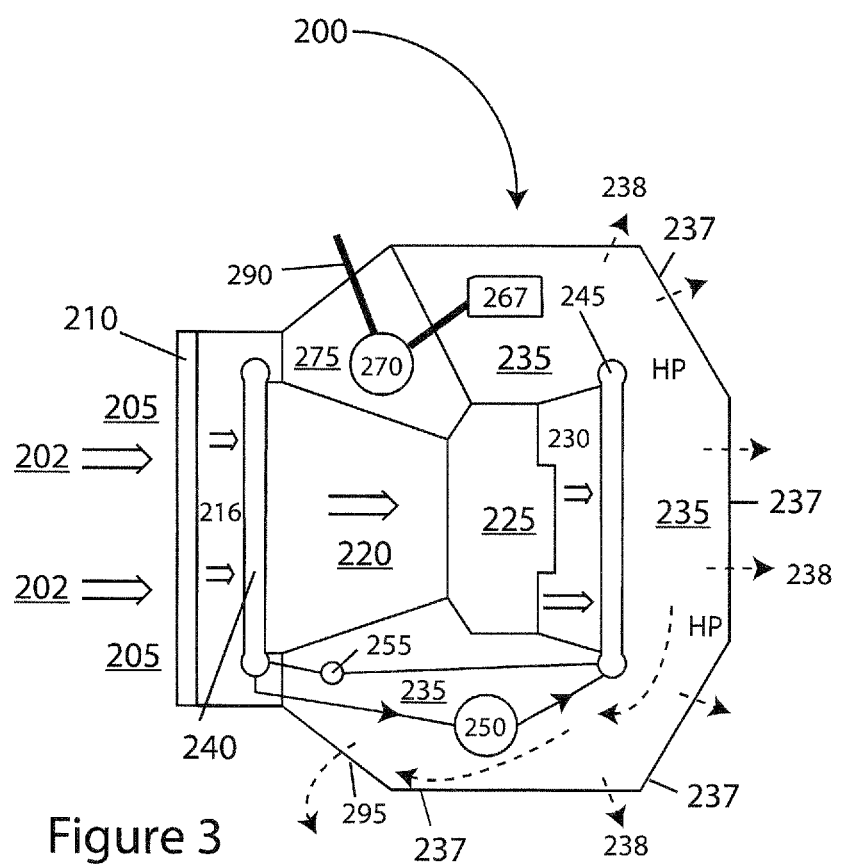
FIGS. 3 and 4 are schematic plan views of second and third embodiments, respectively, of an atmospheric water harvester according to the invention, which second and third embodiments are generally similar to the first embodiment shown in FIG. 1.
Figure 4:
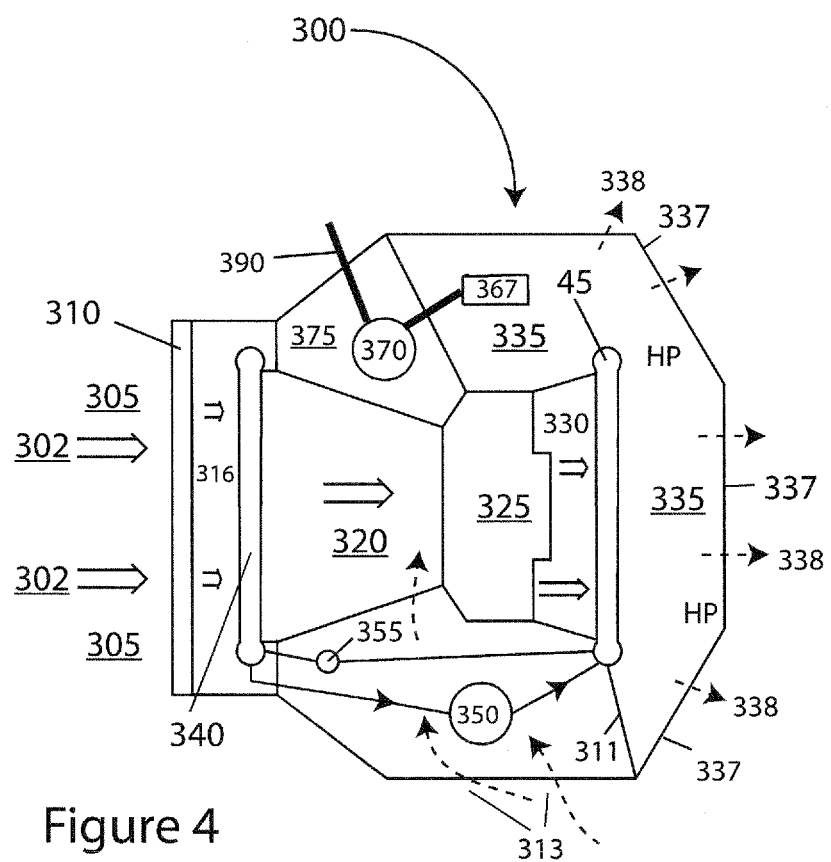

Two further embodiments 200, 300 will be described with reference to FIGS. 3 and 4, respectively, in which there are slight variations in the handling of air within the AWH following extraction of water from it. In these embodiments 200, 300 (as well as in another embodiment 400, as described below), similar system components are similarly numbered, but increased to the corresponding hundreds series to "match" the embodiment number 200, 300, 400. Unless otherwise described, the similarly numbered components are the same as or generally similar to those described above and may have similar attributes.

Where an AWH must be operated in very hot ambient temperatures, or where a compressor that requires external cooling is used, forced-air cooling may be provided by controlling airflow in two general manners. These are shown in FIG. 3, in which an embodiment 200 uses existing exhaust for cooling of the compressor 250, and in FIG. 4, in which an embodiment 300 uses a supplemental supply of ambient air for cooling the compressor 350. FIG. 3 shows airflow around the compressor 250 from the central part of the exhaust chamber 235 created by locating louvered sidewall vents 295 "downstream" from the compressor 250. This configuration forces air to pass the compressor 250 in exiting from the exhaust chamber 235. In the alternate embodiment 300 shown in FIG. 4, an internal partition 311 isolates the compressor 350 from the exhaust chamber 335. In this configuration, vents 313 in the outer hull of the AWH 300 allow air to be pulled in by suction into the air passage 320 upstream from the impeller 325.

The three embodiments 100, 200, 300 that have been described above will work best in high relative humidity (RH) conditions. In general, where RH is high, particularly where temperature is also high and relatively large amounts of water are dissolved in the air, condensation on the evaporator takes place by reducing the temperature of the humid air to the point where condensation initiates. Where intake air is at a high humidity, for instance in excess of 85% RH, water will begin to condense with relatively little energy consumed by chilling. The sensible heat of the humid air (which is the term applied to heat associated with temperature change) must be removed to lower the temperature of the air slightly and bring the air to 100% RH locally, at which point condensation is initiated. As condensation proceeds, the latent heat (which is that required to cause the water vapor to condense to liquid water) is removed by heat exchange on the evaporator. Following the initiation of condensation, both sensible heat and latent heat are removed from the air being processed in the AWH as the air temperature is further reduced slightly and water is condensed and extracted. When RH is low, on the other hand, it is beneficial to be able to remove sensible heat before the air reaches the evaporator so that the cooling potential of the evaporator continues to remove a minimum of sensible heat and a maximum of latent heat, which has the effect of maintaining the energy efficiency of water production. (High humidity ambient air requires very little additional cooling to initiate condensation.) The delivery of air to the evaporator at approximately 90-99% RH, which is the general range for humid ambient air, is the primary objective for the most economic water production through condensation.

Figure 5:
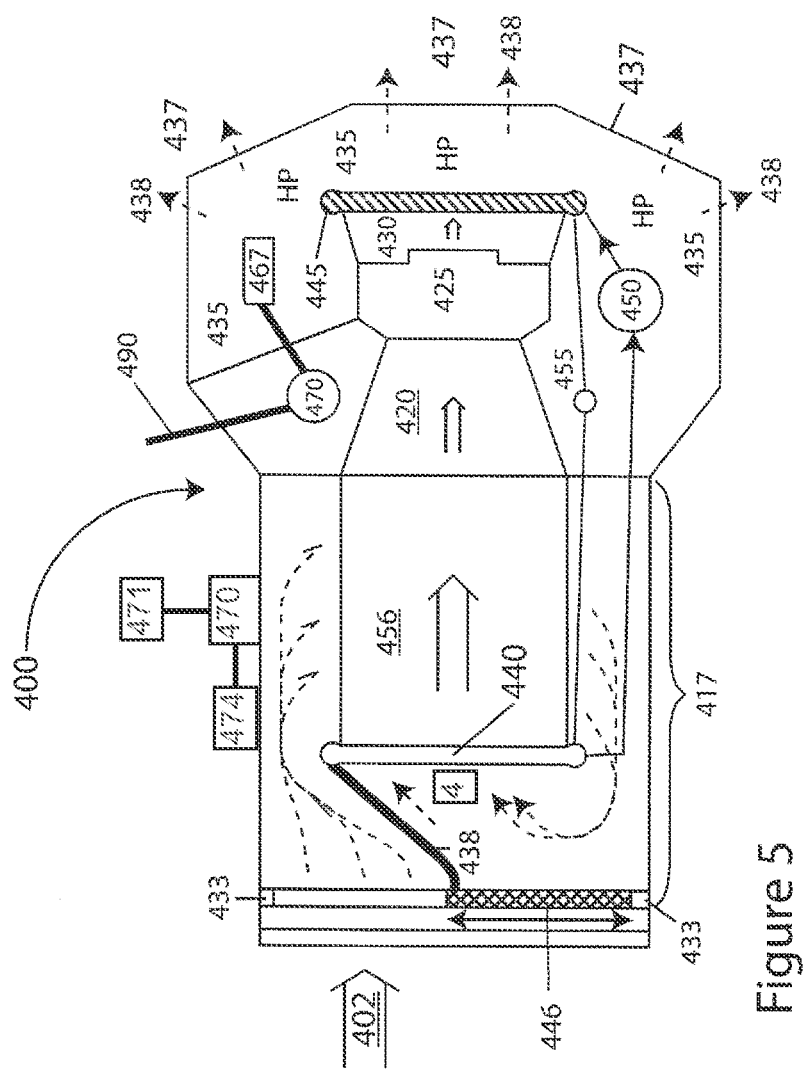
FIGS. 5 and 6 are schematic plan views of a fourth embodiment of an atmospheric water harvester according to the invention illustrating the atmospheric water harvester in two different operational configurations.
Figure 6:
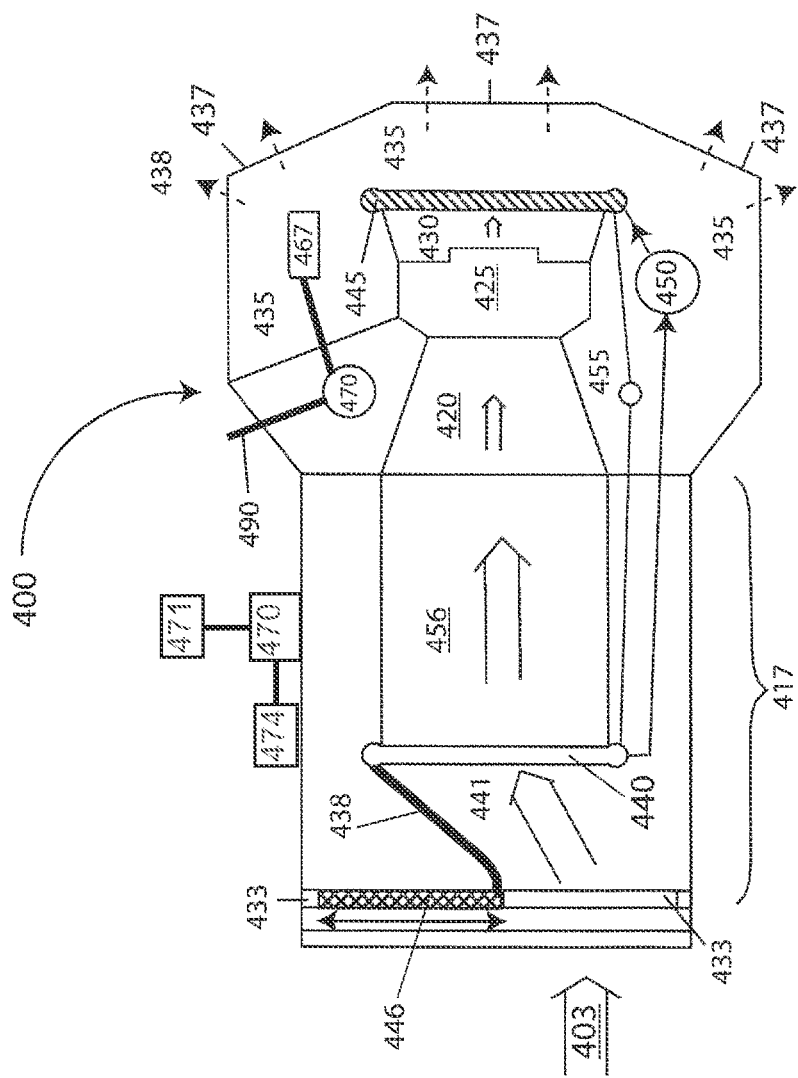

A variable pre-cooling embodiment 400 of an AWH, which is configured to operate well under low as well as high ambient RH conditions and preferably at RH points in between, is illustrated in FIGS. 5 and 6. Most notably in comparison to the embodiments 100, 200, 300 described above, the embodiment 400 includes a variable flow geometry thermal economizer section 417 located upstream of the impeller 425 and its inlet air passageway 420. The thermal economizer section 417 is suitably housed within a forward extension of the AWH housing and includes an air-to-air heat exchanger 456 located between the evaporator 440 (i.e., downstream from the evaporator) and the impeller 425 (i.e., upstream of the impeller). Preferably, the heat exchanger 456 is directly connected to the evaporator 440 and the impeller entry air passageway 420, or is connected via ducting to those components, such that air does not seep out from between the evaporator and the heat exchanger or from between the heat exchanger and the impeller. A preferred air-to-air heat exchanger 456 is fabricated from thin-walled tubes (e.g., as available from Cesaroni Technologies); from thin-walled corrugated plastic plate (e.g., as available from Innergy Tech, AB Segerfroejd, or Greenbox); or from corrugated metal plate (e.g., as available from Xetex and Des Champs Technology). In general, such air-to-air heat exchangers include two sets (at least) of interleaved flow passageways that are typically arranged perpendicularly to each other. In the AWH embodiment 400, the heat exchanger 456 is arranged with 1) a first set of heat transfer flow passageways (not illustrated specifically) oriented longitudinally, i.e., generally aligned with the main or overall direction of flow through the AWH 400; and 2) a second set of heat transfer flow passageways (not illustrated specifically) that are oriented transverse to the first set of heat transfer flow passageways, i.e., laterally as in the embodiment 400 shown in FIGS. 5 and 6 or vertically. (Although the heat transfer flow passageways are not illustrated specifically, their presence and orientation is represented by the thin, dashed-line flow arrows in FIG. 5 that traverse the heat exchanger 456 laterally (representing the second set of flow passageways) and the wide, double-stemmed flow arrow in FIG. 5 that traverses the heat exchanger 456 longitudinally (representing the first set of flow passageways).)

Upstream of the heat exchanger 456, the air intake of the AWH 400, i.e., the entrance to the thermal economizer section 417, is configured to regulate the amount (if any) of air that flows through the second, transverse set of heat exchanger flow passageways. To that extent, a motorized sliding panel 446, mounted in a support or frame 433, is provided near the entrance to the thermal economizer section 417, and an airway partition 438 extends from a lateral mid-location—suitably but not necessarily the center—of the panel support or frame 433 to an end of the evaporator 440. Suitably, the panel 446 extends vertically from the top to the bottom of the thermal economizer section entrance; laterally, assuming the airway partition 438 abuts the frame 433 at the lateral center of the AWH 400, the panel 446 is slightly wider than half the width of the thermal economizer section entrance.

With this arrangement of the AWH intake, when the panel 446 is all the way to one side of the entrance to the thermal economizer section 417 (i.e., to one side of the airway partition 433) as shown in FIG. 5, a first inlet aperture 402 is formed on the opposite side of the airway partition 433. When the apparatus 400 is in this operational configuration, air enters the thermal economizer section 417 through the first inlet aperture 402 and flows through the transverse (e.g., lateral) set of air passageways through the air-to-air heat exchanger 456. The air then turns and flows through the evaporator 440, which cools/chills the air to condense moisture out of it, before the air flows through the longitudinal set of air passageways through the heat exchanger 456 and on to the impeller. Because the air flowing through the longitudinal set of heat exchanger air passageways has been cooled by the evaporator 440, it will absorb sensible heat from the air flowing through the transverse set of heat exchanger air passageways, thus pre-cooling the incoming air before it reaches the evaporator 440. This allows a greater percentage of the evaporator work to be directed to removing latent heat from the incoming air and thus improves water production efficiency.

On the other hand, as noted above, it is relatively easy to condense moisture from ambient air that has high RH. Therefore, it becomes less important or beneficial to pre-cool the air before it passes across the evaporator 440. In this case, the panel 446 may be moved all the way across the entrance to the thermal economizer section 417, to the opposite side of the airway partition 433, which opens up a second inlet aperture 403 (i.e., a bypass inlet) as shown in FIG. 6. When the apparatus 400 is in this operational configuration, air enters the thermal economizer section 417 through the second inlet aperture 403 and flows immediately over evaporator 440, then down to the fan/impeller 425 through the longitudinal set of heat exchanger air passageways, without first having flowed through the transverse set of heat exchanger air passageways for pre-cooling. This improves operational efficiency in terms of amount of water produced per unit of electricity consumed. In particular, air density increases with humidity, and resistance to flow (i.e., frictional drag) increases with air density. Therefore, by shortening the overall airflow distance, and in particular by bypassing the portion of the flow course passing through the transverse set of heat exchanger airflow passageways, airflow drag is reduced. This, in turn, reduces operational load on the fan or impeller 425 and hence the cost to drive the fan or impeller for a given volumetric flow rate of air through the AWH 400. Alternatively, for a given amount of electricity consumed, the fan or impeller can be run faster (assuming it has that capability), which allows more water to be produced in a given period of time and at a given operating cost.

In practice, the panel 446 may be positioned at various points between the two endpoints shown in FIGS. 5 and 6. Depending on the position of the panel 446, the relative sizes of the first and second inlet apertures 402, 403 will vary, which regulates the amount of air flowing through the transverse set of heat exchanger airflow passageways and hence how much pre-cooling of the incoming air is provided. Suitably, the position of the panel 446, and hence the relative sizes of the inlet apertures 402, 403, is controlled automatically by a computer controller 470, which receives information on ambient conditions from on-board temperature and humidity sensors 471, 474. Using pre-programmed maps or lookup tables, and/or using sensors 4 that measure internal humidity levels at the evaporator so as to provide feedback-based control, the controller adjusts the position of the panel 446 such that the intake air is cooled to the point that 90% to 99% RH air is passing across the evaporator and/or until, at some point, the pre-cooling potential is at a maximum. From that point to lower temperatures and RH, an increasing amount of sensible heat has to be removed from the incoming air by the evaporator 440, which means that increasing electricity must be used to produce relatively smaller amounts of water. With such an automatic configuration of the AWH, the speed of the fan/impeller 425 may also be adjusted automatically (assuming it has variable speed capability).

In a simpler implementation, automatic control over the position of the panel 446, and hence the sizes of the intake apertures 402, 403, may be omitted. In that case, it may be preferable for the AWH 400 to be configured with springs, cams, detents, etc. (not shown) such that the panel 446 stably assumes only the position shown in FIG. 5 or the position shown in FIG. 6, but not positions in between. The user would then manually move the panel to one side or the other depending on humidity existing generally at the time the AWH is being operated.

Figure 7:
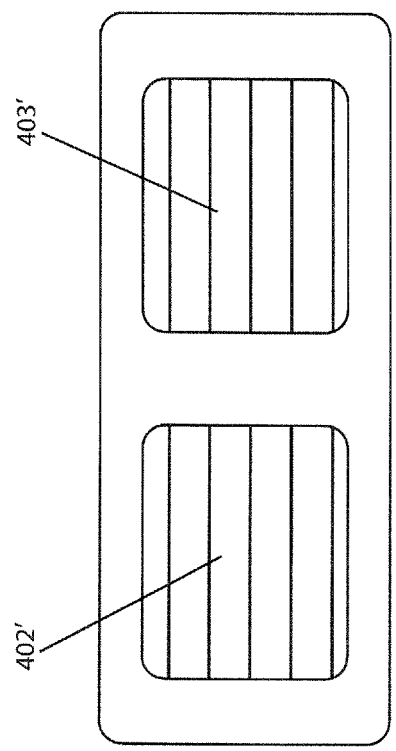
FIG. 7 is a schematic end view illustrating a variant of the embodiment of an atmospheric water harvester shown in FIGS. 5 and 6.

Furthermore, in the embodiment 400 of an AWH illustrated in FIGS. 5 and 6, the sizes of the two air intake apertures 402 and 403 are directly linked to each other and always vary inversely to each other as the position of the panel 446 changes. For finer control and optimization of efficiency (water produced per unit of electricity, water produced per unit of time, or water produced per volumetric unit of airflow), on the other hand, it may be desirable for the sizes of the air intake apertures to be independently controllable (preferably by computer). To that end, the air intake apertures may be formed as separate, louvered openings 402', 403', as illustrated in FIG. 7, sphincter openings, etc. (A variable speed fan/impeller is particularly suitable for use with such an embodiment to fine-tune operation of the AWH as much as possible.)

Figure 8:
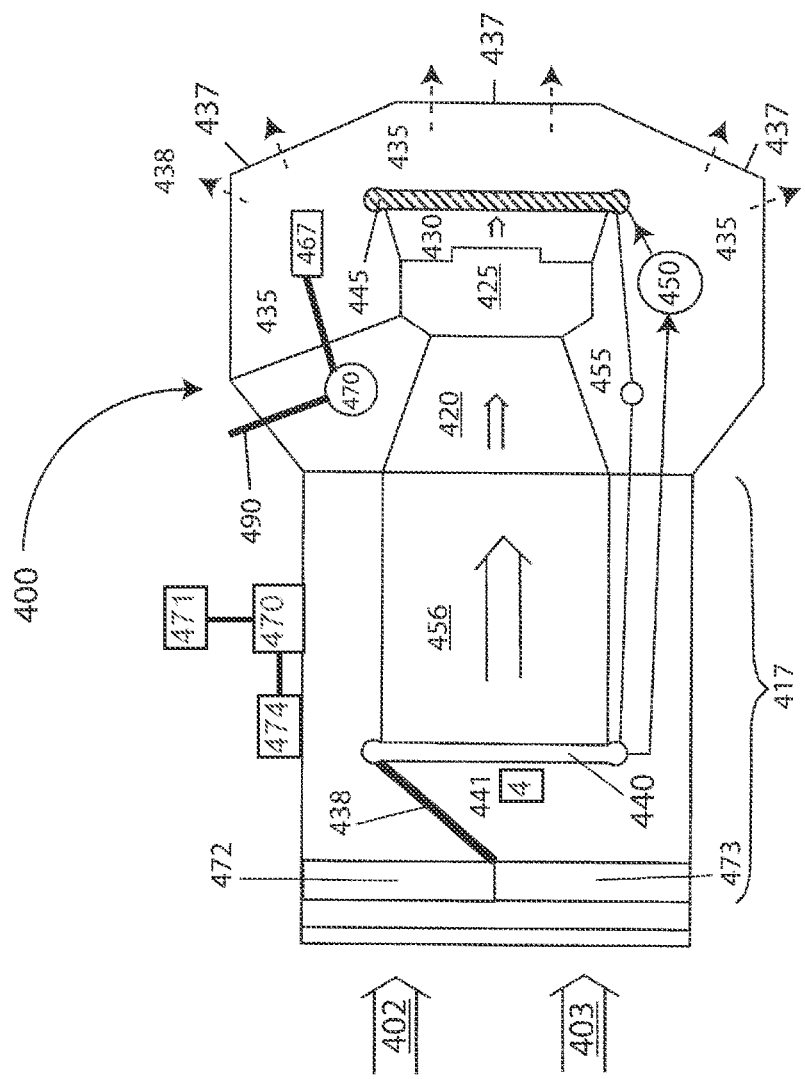
FIG. 8 is a schematic plan view illustrating a variant of the embodiment of an atmospheric water harvester shown in FIGS. 5 and 6.

Alternatively, instead of controlling the amount of airflow through each of the inlets 402', 403' by varying the size of their openings, it is possible to regulate the relative amounts of airflow by controlling the speed of the air flowing through each opening. To that end, a variable speed fan or impeller 472, 473 can be provided in association with each opening 402', 403', as shown in FIG. 8. Such variable speed fans or impellers could be provided in addition to the variable speed fan or impeller 425 or, alternatively, instead of the fan or impeller 425.

Various attributes of the embodiments 100, 200, 300 of AWH's described above (e.g., variable speed refrigeration compressor) may be incorporated into the embodiment 400 of an AWH as well.

Reverting to more general discussion applicable to any of the embodiments disclosed herein, unwanted mixing between intake and exhaust air has the potential to reduce the humidity of the intake air, which would have the effect of increasing energy use and decreasing water production. The intake and exhaust are located on generally opposite sides of the apparatus to separate them as much as possible without using intake or exhaust pipe extensions. In still air, exhaust will generally tend to be propelled away from the apparatus while intake air will be drawn from the ambient air at the other end. Where a water harvester is operated outdoors, changing wind direction and velocity may be anticipated. Shift of wind direction will have an impact upon the potential for mixing intake and exhaust air, particularly when the wind is blowing from the exhaust end and toward the intake end of the water harvester. Optimum conditions for minimum mixing of intake and exhaust air occur when the wind is blowing generally on the intake and away from the exhaust.

A manual switch may be provided on the control panel (not shown) to initiate a timed cycle in which the air system operates but the condenser system is turned off. This allows air to be passed through the unit without water being condensed from the air. This provides for drying of the internal air courses and their surfaces (including the evaporator and condenser). At the initiation of the cleaning/drying cycle, dilute chlorine spray from a hand-pump rechargeable container is sprayed into the intake air stream in sufficient quantities so that all internal air passages, including the main condenser and water collection area, are sufficiently exposed to allow for effective sterilization of the system. The unit continues to run, which has the effect of drying the internal surfaces and leaving the unit dry. If it is to be operated again in a relatively short time or if it is to be stored in a dry, climate-controlled location, packing in an air-tight container may not be necessary. Where the unit may be off for more than a short time, it should be packed in a sealed manner.

Provision may be made for quick-fitting a backup hand pump so that water may be filter-treated or removed from the water harvester under pressure if the pump 167 fails. It is also possible to recover the water directly from the removable water tank by removing it and pouring the water out manually.

The apparatus is wheeled and has handles suitable for pulling or lifting, even on ground that is not flat or smooth. It is designed and fabricated to be robust and to be operated out of doors without regard for weather conditions. All embodiments of the water harvester are weather-proofed, with sealed electronics, louvered intakes, screening as part of the filter assembly 110 (all embodiments) and on intakes and exhausts. The apparatus is suitable for placement by hand, without mechanized lifting or towing equipment. It can be left in one location over a period of time and can be manually brought under cover for protection in advance of major storms and redeployed manually.

The foregoing disclosure is only intended to be exemplary of the methods and apparatus of the present invention. Departures from and modifications to the disclosed embodiments may occur to those having skill in the art. For example, while an air-to-air heat exchanger as disclosed and described may be preferred, other forms of heat exchangers such as heat pipes, a fluid loop recirculation system, or an inverse vapor compression refrigeration system running in tandem with the "primary" refrigeration section may be implemented. Furthermore, the evaporator of a vapor compression-based refrigeration system is but one type of cooling device that may be used to cool the incoming air. Other cooling devices such as thermoelectric cooling devices could also be used. The scope of the invention is set forth in the following claims.

We claim:

1. An atmospheric water harvester (AWH), comprising:
   a housing;
   a cooling device disposed within the housing for condensing atmospheric moisture;
   an airflow passageway extending through the housing from a first inlet, across the cooling device, to one or more outlets;
   a heat exchanger having a first heat exchange portion disposed upstream of the cooling device and a second heat exchange portion disposed downstream of the cooling device, the heat exchanger being arranged to transfer heat from air traversing the first heat exchange portion to cooler air that has traversed the cooling device and that is traversing the second heat exchange portion, whereby air entering the airflow passageway through the first inlet can be pre-cooled before traversing the cooling device;
   a second inlet, which is a bypass inlet, arranged to introduce air into the airflow passageway at a location downstream of the heat exchanger's first heat exchange portion and upstream of the cooling device, whereby air entering the airflow passageway through the second inlet is not pre-cooled before traversing the cooling device;
   one or more fans or impellers arranged to propel air through the atmospheric water harvester; and
   ambient temperature and humidity sensors;
   wherein the atmospheric water harvester further comprises a controller that is programmed to control the relative amounts of air entering the airflow passageway through the first and second inlets based on measured ambient temperature and humidity so as to achieve a predetermined level of relative humidity of air that reaches to traverse the cooling device.

2. The AWH of claim 1, wherein the heat exchanger comprises an air-to-air heat exchanger; the first heat exchange portion comprises a first set of heat transfer flow passageways; and
   the second heat exchange portion comprises a second set of heat transfer flow passageways in thermal communication with the first set of heat transfer flow passageways.

3. The AWH of claim 1, wherein the relative sizes of the first and second inlets are variable so as to control the relative amounts of air entering the airflow passageway through the first and second inlets.

4. The AWH of claim 3, wherein the sizes of the first and second inlets directly and inversely co-vary, with the size of the first inlet being at a maximum when the size of the second inlet is at a minimum and vice-versa.

5. The AWH of claim 4, further comprising a sliding panel the position of which defines the relative sizes of the first and second inlets.

6. The AWH of claim 4, wherein the minimum size of each of the first and second inlets is totally closed.

7. The AWH of claim 3, wherein the sizes of the first and second inlets are independently variable.

8. The AWH of claim 1, wherein said one or more fans or impellers comprises a variable speed fan or impeller associated with each of the first and second inlets whereby the relative amounts of air entering the airflow passageway through the first and second inlets can be controlled by varying the speeds of the respectively associated fans or impellers.

9. The AWH of claim 1, wherein said one or more fans or impellers comprises a variable speed fan or impeller located at a downstream portion of said airflow passageway.

10. The AWH of claim 1, wherein the cooling device is metal and has a coating which prevents metal from dissolving into water condensing thereon.

11. The AWH of claim 1, wherein the cooling device has an antimicrobial coating thereon.

12. The AWH of claim 1, wherein the AWH comprises a vapor compression-based refrigeration system including a condenser, an evaporator, and a compressor and said cooling device comprises said evaporator.

13. The AWH of claim 12, wherein the compressor is a variable speed compressor.

14. The AWH of claim 1, further comprising a water collection region disposed below said cooling device for collecting water that has condensed on said cooling device and run off of said cooling device under the influence of gravity.

15. The AWH of claim 14, further comprising a pump disposed within said water collection region for transferring water from said water collection region to a user.

16. The AWH of claim 15, further comprising a water filter through which water transferred by said pump passes.

17. The AWH of claim 1, further comprising an air filter associated with each of said first and second inlets.

18. An atmospheric water harvester (AWH), comprising:
a housing;
a cooling device disposed within the housing for condensing atmospheric moisture;
an airflow passageway extending through the housing from a first, variable-flow-volume inlet, across the cooling device, to one or more outlets;
a heat exchanger having a first heat exchange portion disposed upstream of the cooling device and a second heat exchange portion disposed downstream of the cooling device, the heat exchanger being arranged to transfer heat from air traversing the first heat exchange portion to cooler air that has traversed the cooling device and that is traversing the second heat exchange portion, whereby air entering the airflow passageway through the first inlet can be pre-cooled before traversing the cooling device;
a second variable-flow-volume inlet, which is a bypass inlet, arranged to introduce air into the airflow passageway at a location downstream of the heat exchanger's first heat exchange portion and upstream of the cooling device, whereby air entering the airflow passageway through the second inlet is not pre-cooled before traversing the cooling device;
ambient temperature and humidity sensors; and
one or more fans or impellers arranged to propel air through the atmospheric water harvester;
wherein the atmospheric water harvester further comprises a controller that is programmed to control the relative amounts of air entering the airflow passageway through the first and second variable-flow-volume inlets based on measured ambient temperature and humidity so as to achieve a predetermined level of relative humidity of air that reaches to traverse the cooling device.

19. An atmospheric water harvester (AWH), comprising:
a housing;
a cooling device disposed within the housing for condensing atmospheric moisture;
an airflow passageway extending through the housing from a first inlet, across the cooling device, to one or more outlets;
a heat exchanger having a first heat exchange portion disposed upstream of the cooling device and a second heat exchange portion disposed downstream of the cooling device, the heat exchanger being arranged to transfer heat from air traversing the first heat exchange portion to cooler air that has traversed the cooling device and that is traversing the second heat exchange portion, whereby air entering the airflow passageway through the first inlet can be pre-cooled before traversing the cooling device;
a second inlet, which is a bypass inlet, arranged to introduce air into the airflow passageway at a location downstream of the heat exchanger's first heat exchange portion and upstream of the cooling device, whereby air entering the airflow passageway through the second inlet is not pre-cooled before traversing the cooling device;
one or more fans or impellers arranged to propel air through the atmospheric water harvester;
ambient temperature and humidity sensors; and
means for controlling the relative amounts of air entering the airflow passageway through the first and second inlets, said means for controlling including a controller that is programmed to control the relative amounts of air entering the airflow passageway through the first and second variable-flow-volume inlets based on measured ambient temperature and humidity so as to achieve a predetermined level of relative humidity of air that reaches to traverse the cooling device.

* * * * *